(12) United States Patent
De Beer

(10) Patent No.: US 7,873,150 B2
(45) Date of Patent: Jan. 18, 2011

(54) TELEPHONE CALL DIALING

(75) Inventor: Leon De Beer, Berkshire (GB)

(73) Assignee: Interoute Communications Ltd, London (GB)

( * ) Notice: Subject to any disclaimer, the term of this patent is extended or adjusted under 35 U.S.C. 154(b) by 980 days.

(21) Appl. No.: 11/682,828

(22) Filed: Mar. 6, 2007

(65) Prior Publication Data

US 2007/0211870 A1   Sep. 13, 2007

Related U.S. Application Data

(63) Continuation of application No. 10/488,104, filed as application No. PCT/GB02/04077 on Sep. 6, 2002, now abandoned.

(30) Foreign Application Priority Data

Sep. 10, 2001   (GB) .................................. 0121824.7

(51) Int. Cl.
    *H04M 15/00* (2006.01)
(52) U.S. Cl. .............................. 379/114.17; 379/114.2; 379/221.14; 455/406; 455/408
(58) Field of Classification Search ................. 379/111, 379/114.01, 114.02, 114.09, 114.17, 114.2, 379/121.01, 121.05, 130, 220.01, 221.14; 455/406, 407, 408
    See application file for complete search history.

(56) References Cited

U.S. PATENT DOCUMENTS

| | | | | |
|---|---|---|---|---|
| 5,799,072 A * | 8/1998 | Vulcan et al. | .......... | 379/114.02 |
| 5,862,203 A * | 1/1999 | Wulkan et al. | .......... | 379/114.02 |
| 6,856,598 B1 * | 2/2005 | Stanfield | ...................... | 370/235 |
| 2004/0018829 A1 * | 1/2004 | Raman et al. | ................ | 455/406 |
| 2004/0077334 A1 * | 4/2004 | Joyce et al. | .................. | 455/406 |

\* cited by examiner

*Primary Examiner*—Binh K Tieu
(74) *Attorney, Agent, or Firm*—Oblon, Spivak, McClelland, Maier & Neustadt, L.L.P.

(57) ABSTRACT

A communications device such as a mobile telephone (1) responds to the input of a dialed number for a call destination (2) by generating and outputting a request message transmitted to a control centre (7) via a telecommunications system (3). The device receives a response message from the control centre containing routing data and credit data representing remaining credit within an account limit of the subscriber. An outgoing communications session is then initiated using the routing data which may for example enable a dialed telephone number to be modified to achieve optimum routing to the call destination via one or more preferred networks. The device also includes a credit control application (83) for limiting the duration of the communication in accordance with the credit data. Mobile telephones may thereby be used with a prepayment subscription account even during roaming operation in which the mobile telephone registers with a network other than the subscriber's home network.

55 Claims, 16 Drawing Sheets

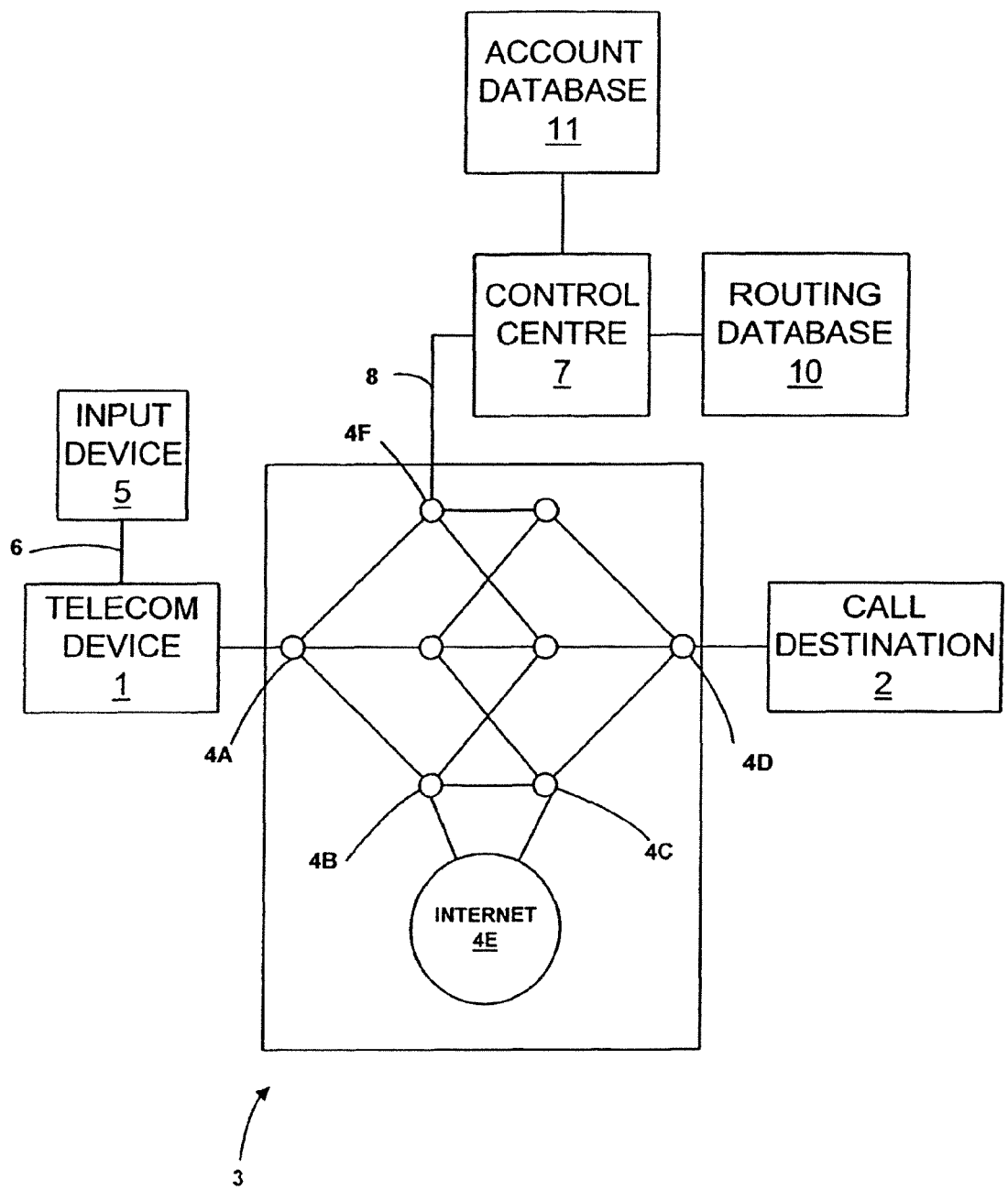

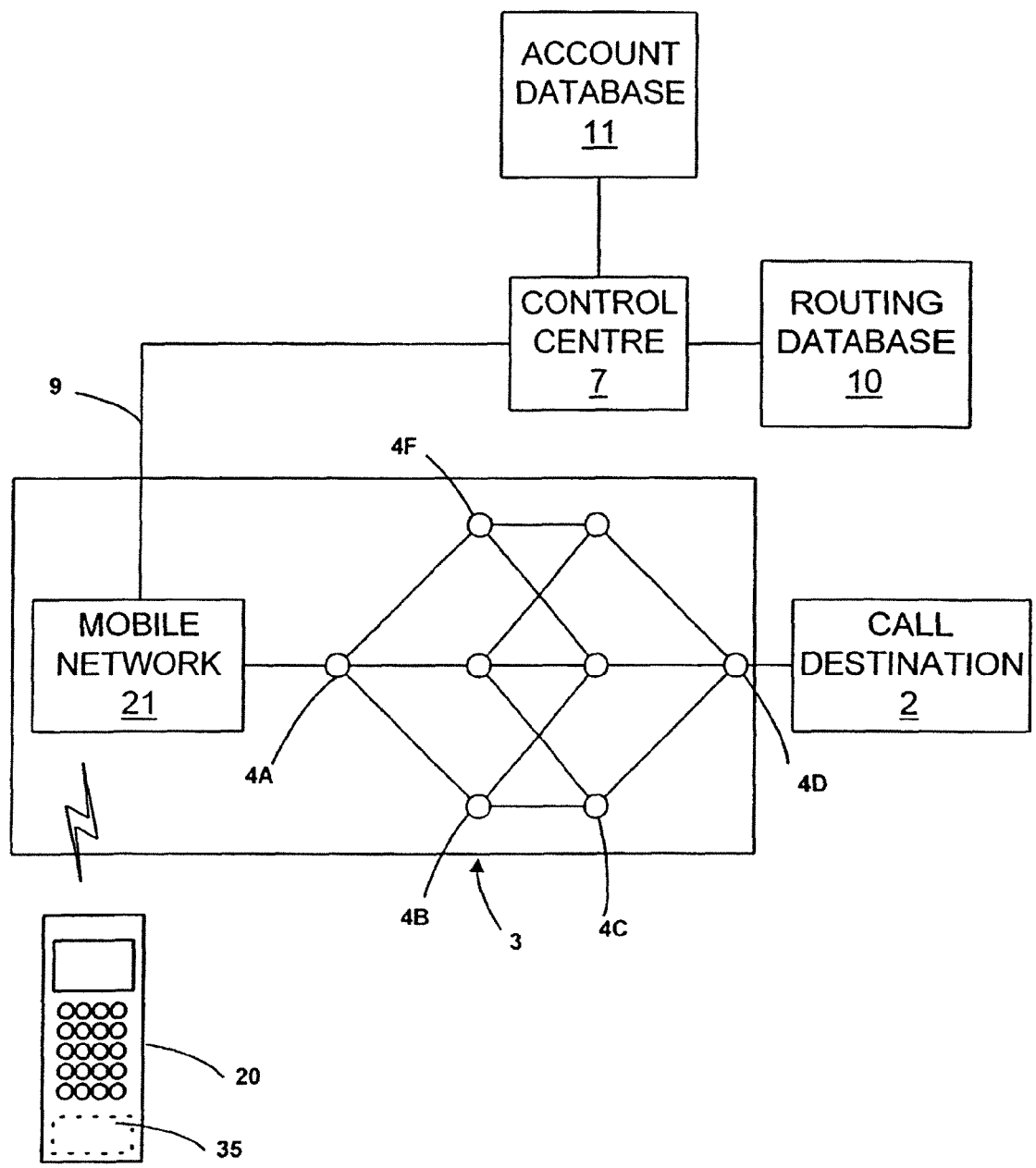

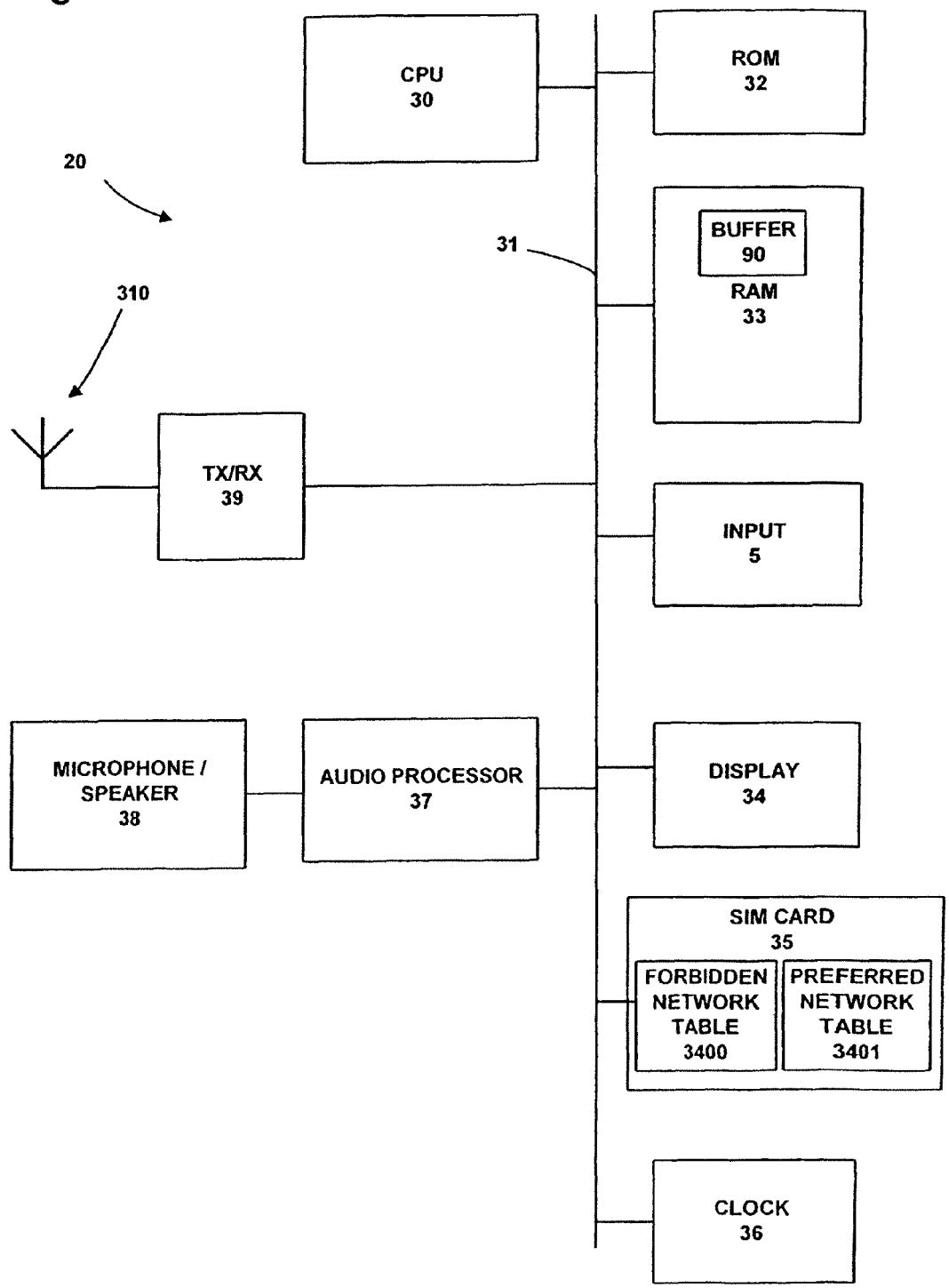

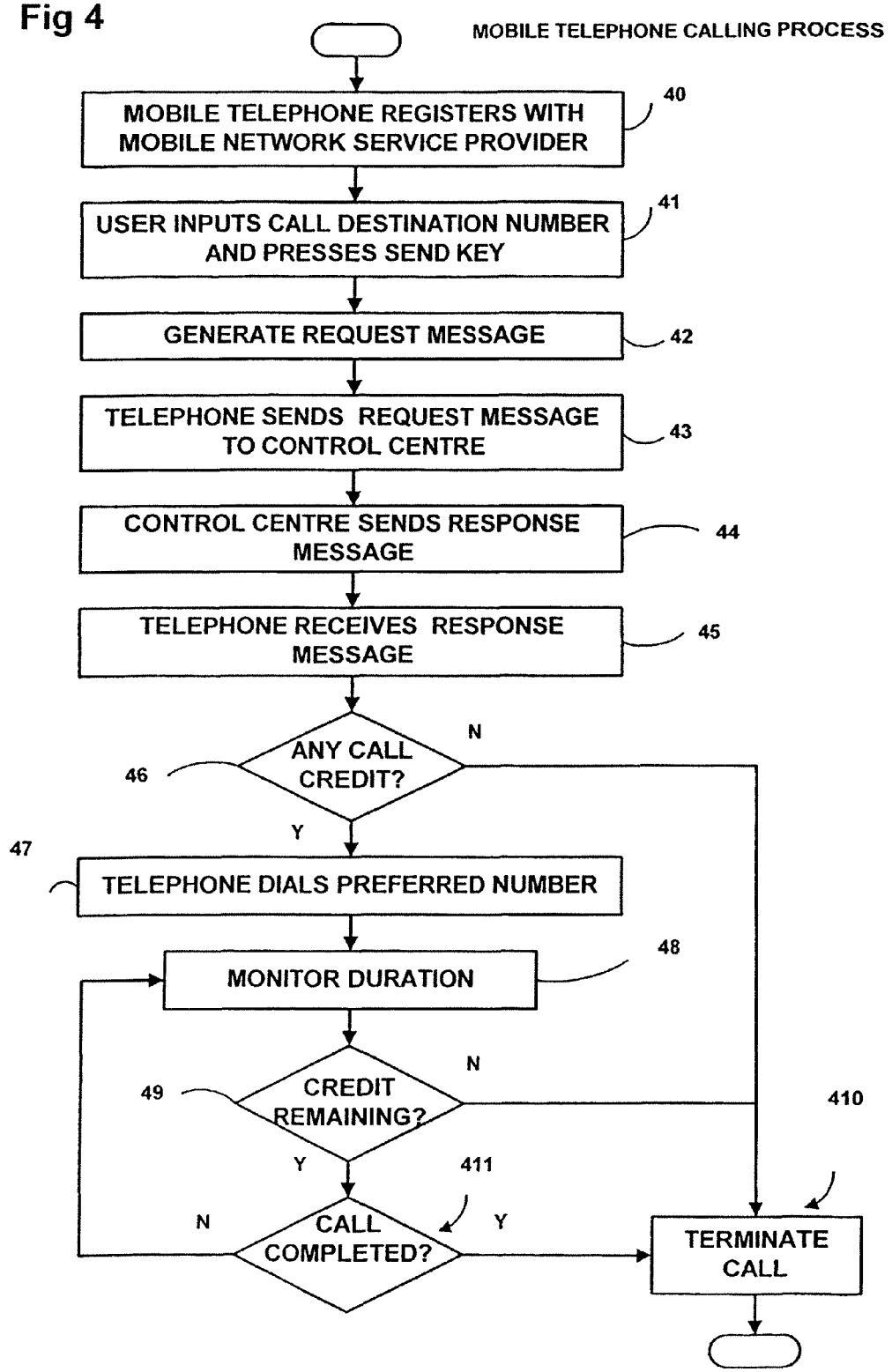

Fig 5 REQUEST MESSAGE
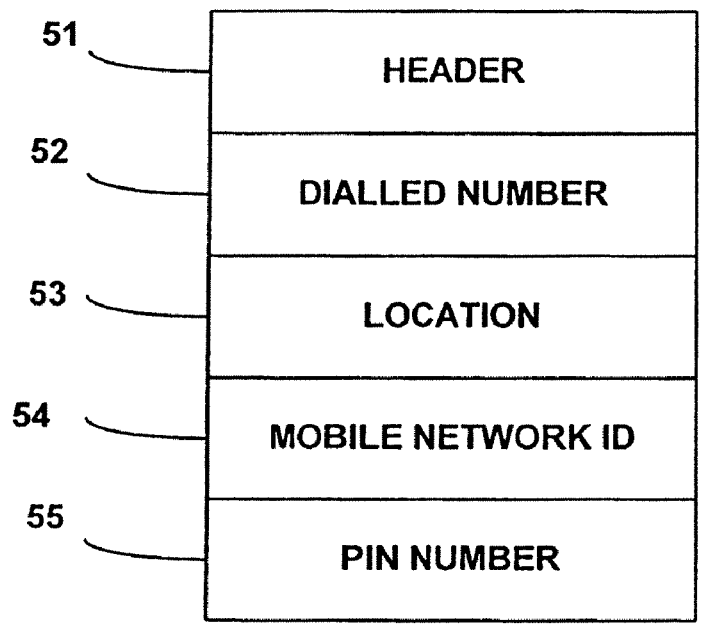
Fig 6 RESPONSE MESSAGE
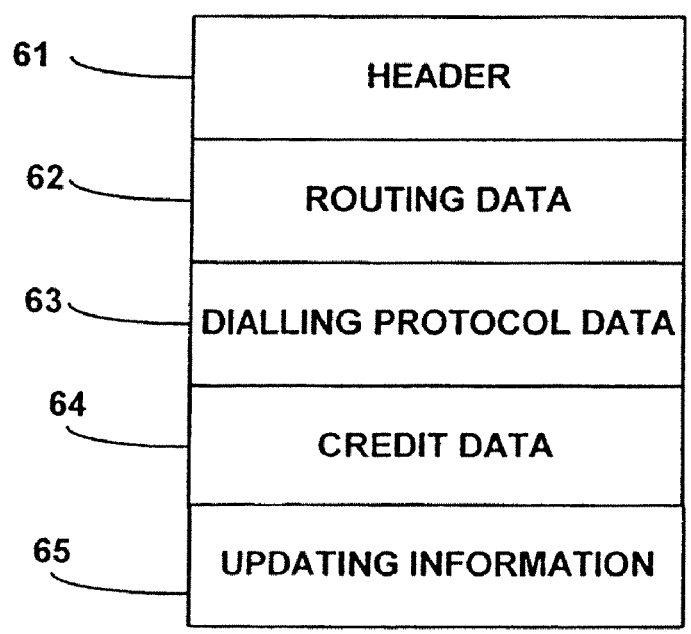

Fig 9 — MOBILE TELEPHONE OPERATION

DIALLING A TELEPHONE CALL
FROM A FIXED LINE TELEPHONE

Fig 12    REQUEST MESSAGE
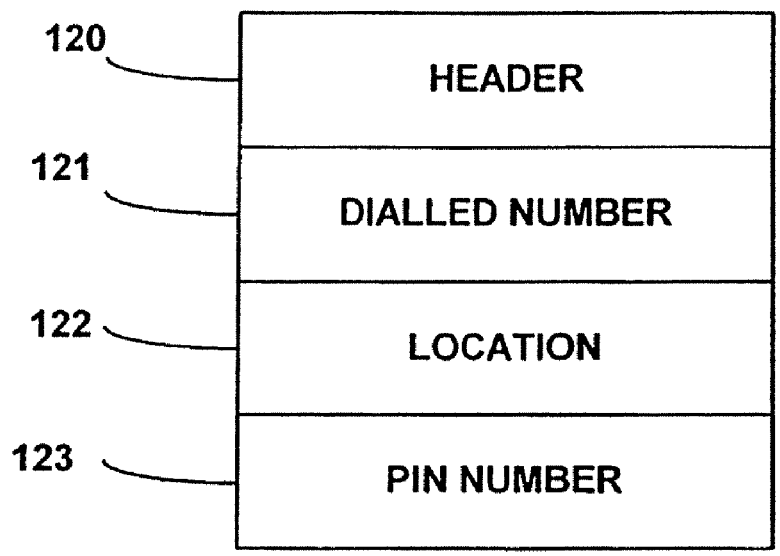
Fig 13    RESPONSE MESSAGE
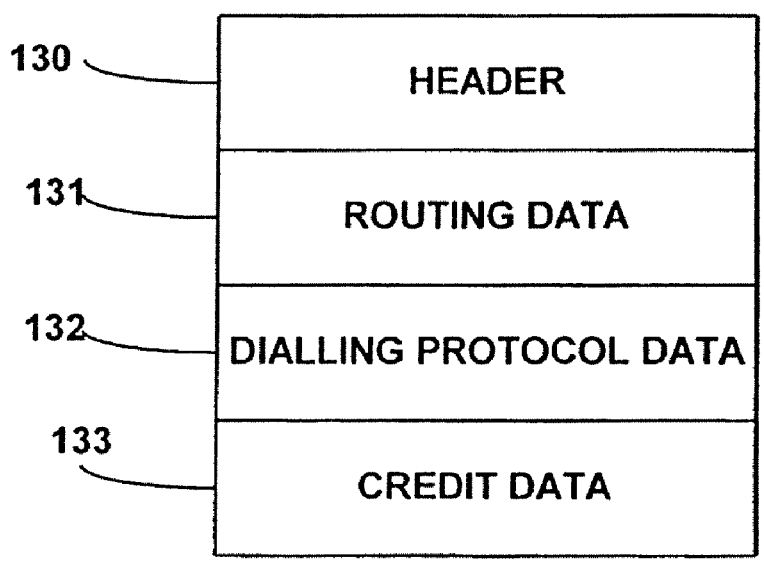

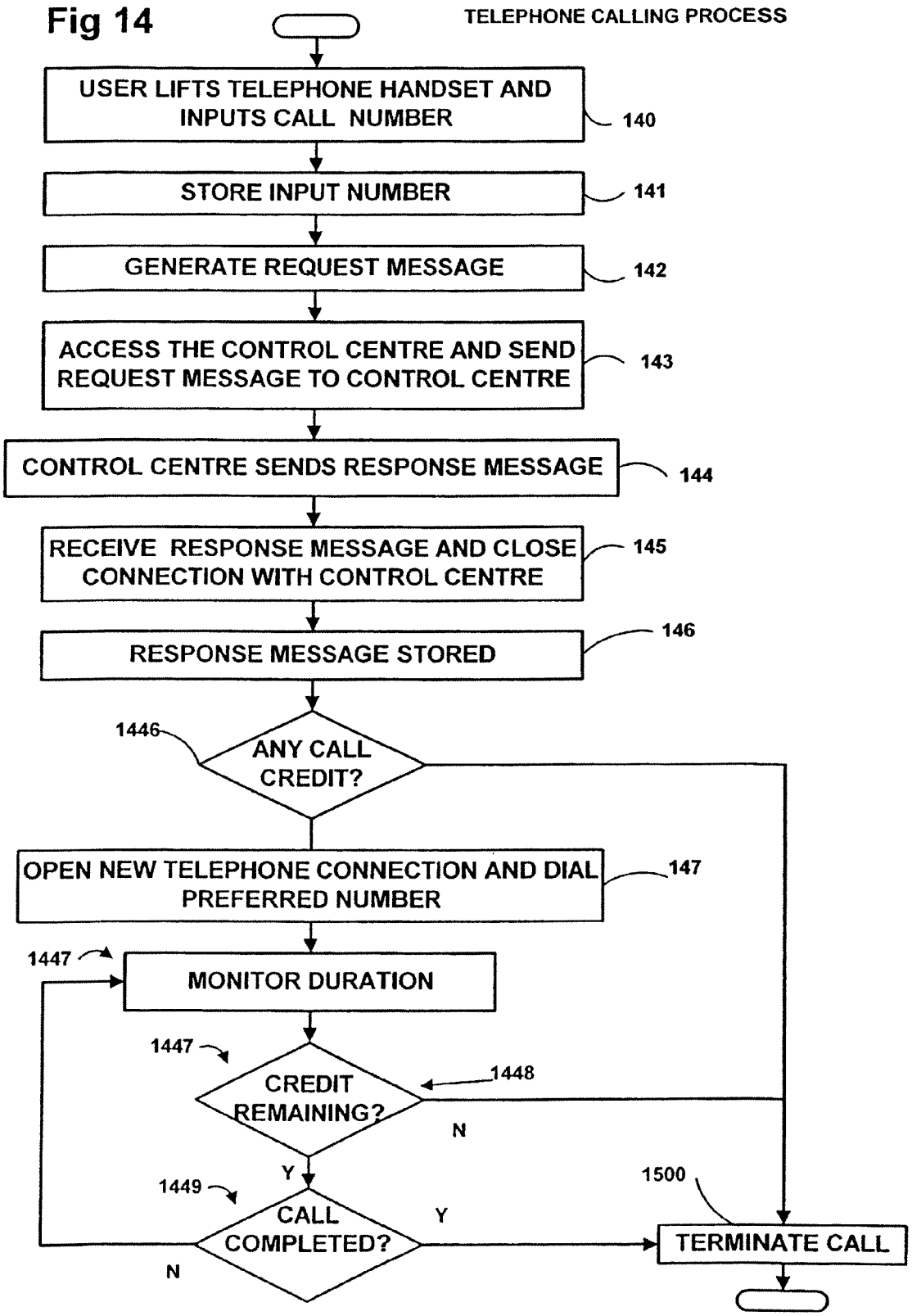

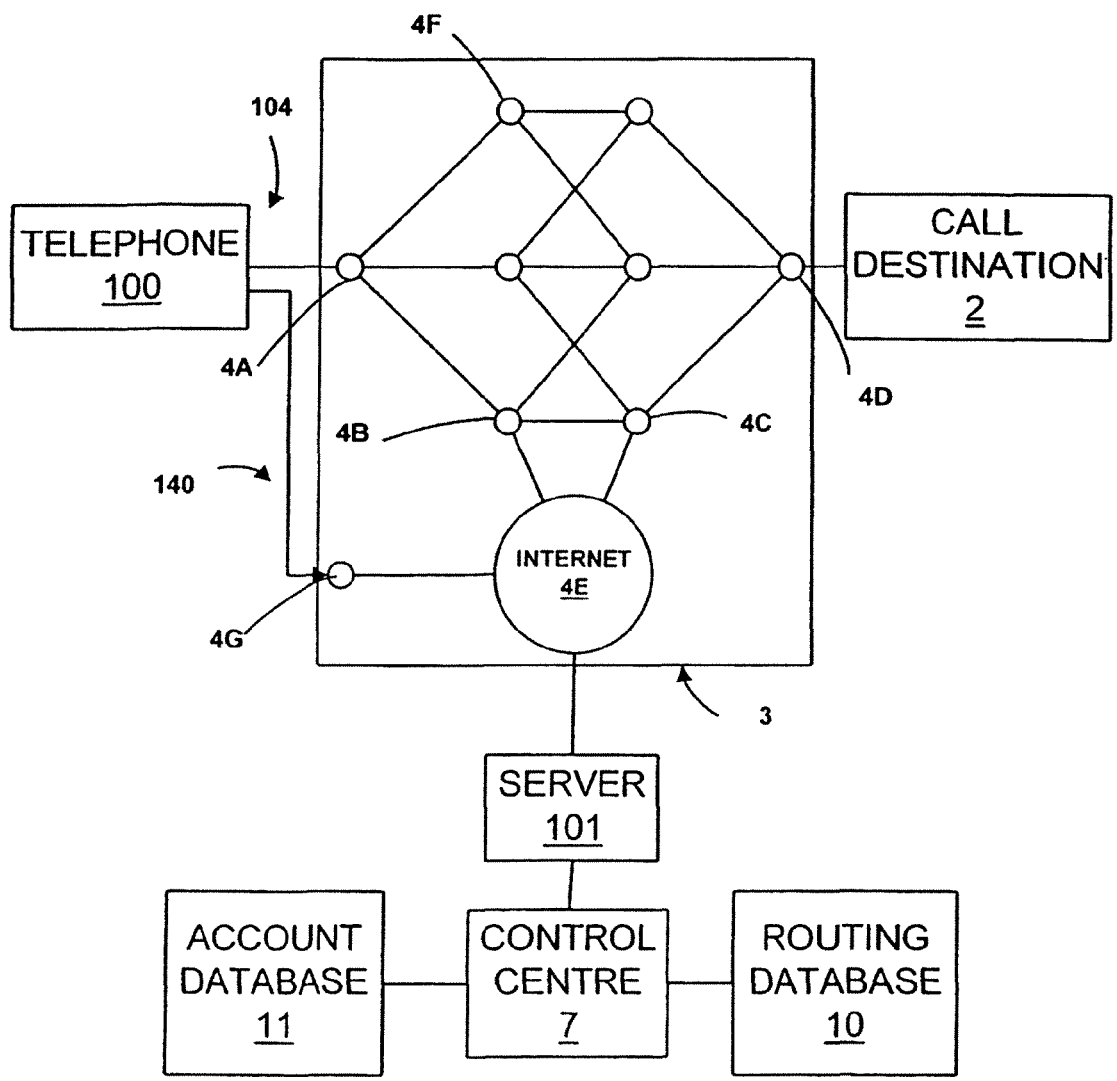
Fig 15 — DIALLING A TELEPHONE CALL FROM A FIXED LINE TELEPHONE HAVING SEPAREATE INTERNET CONNECTION DIALLING A TELEPHONE CALL FROM A FIXED LINE TELEPHONE CONNECTED TO A ROUTING DEVICE Fig 17    ROUTING DEVICE

TELEPHONE CALL DIALING

BACKGROUND OF THE INVENTION

1. Field of the Invention

This invention relates to telephone call dialling in a controlled credit environment and in particular but not exclusively to the use of telecommunications terminals in a prepaid environment where the terminals are capable of dialling telephone numbers and modifying the telephone number input by a user in order to obtain preferred call routing.

2. Description of the Related Art

Recent trends in telecommunications have resulted in a proliferation in the number of telephone networks and service providers available to a user of telecommunication devices such as telephones, facsimile machines and various types of computer based apparatus equipped with modems. A user wishing to initiate a telephone call for a communications session for audio, audio visual, facsimile, or digital data transmission with a call destination will generally input the telephone number of the call destination to the telecommunications device and will rely upon the network to which the device is locally connected to decide upon the route taken by the call between the local network and the call destination. Alternatively, the user may choose to access facilities of a service provider by adding a prefix to the call destination telephone number. The service provider may then provide services at reduced costs and may include routing the call in a manner determined by the service provider.

It is known from WO 00/07347 to provide a telephone which includes a route determining means which automatically modifies the number input by the user when dialling an outgoing call, the telephone having means for referring to an internally stored look-up table covering all possible call destinations to obtain routing information for determining the optimum route, thereby allowing an appropriate prefix code to be automatically selected and added.

Such arrangements however require the look-up table to be periodically refreshed with updating information in order to take account of changes in charging rates applied by service providers for given routes and to take account of variations in performance characteristics of various networks from which a selected route is to be chosen.

Co-pending United Kingdom patent application GB-A-2365259 describes an improved system in which routing data is obtained using an exchange of message between the telephone and a control centre wherein the telephone responds to the input of a dialled number by outputting a request message containing the dialled number to the control centre. A response message from the control centre contains routing data used by the telephone in placing a call to the required destination.

It is also known to provide a communications device operating in a prepaid service environment in which a subscriber prepays funds into an account of an operator and the cost of calls is debited from the account. The subscriber is required to maintain the account in credit for continued use of the service and for example cannot initiate a new call if remaining credit is zero or below a minimum threshold value and will have an existing call truncated if credit expires during the making of an existing call.

The control of the making of prepaid calls in dependence upon the account status of the subscriber is straightforward if the device is using a network controlled by the network operator with whom the subscriber has an account. If this is not the case however, as for example in the case of mobile telephones which are capable of "roaming" operation in which the telephone registers with a network other than the subscriber's home network, it is more complex to control network access and billing in a prepaid environment. The present invention seeks to provide an improved method of routing telephone calls from a variety of telecommunications devices in a prepaid environment and a telecommunications device for use in such a method.

SUMMARY OF THE INVENTION

One aspect of the present invention provides a telecommunications device which responds to an input telephone number by sending a request message to a control centre in order to obtain a response message which includes routing data and account information. A preferred telephone number which is determined in accordance with the routing data is then dialled to access the call destination via a preferred route. The message may contain the preferred number in its entirety. Alternatively, the routing data may be a prefix to be added to the input telephone number, instructions for otherwise modifying the input telephone number, or an instruction for the preferred number to be identical to the input number. The initiating and duration of the call are controlled using the account data in a manner which avoids the account being overdrawn.

A further aspect of the invention relates to accounts other than prepaid subscription accounts where the subscriber is billed for calls which have already been made. The account may be controlled in a manner which limits the maximum accrued charges in the account and credit control is applied to prohibit further calls, or a call is interrupted, if the account limit is reached.

Embodiments are described in which a device in accordance with the present invention may be constituted by a telephone, facsimile machine, computer apparatus, private branch exchange or routing device.

A further aspect of the invention relates to a control centre for receiving request messages and generating response messages.

BRIEF DESCRIPTION OF THE DRAWINGS

Preferred embodiments of the present invention will now be described by way of example only and with reference to the accompany drawings of which;

FIG. 1 is a schematic diagram of a generalised telecommunications device connected to a call destination via a telecommunications system;

FIG. 2 is schematic diagram of a mobile telephone connected to a call destination via a telecommunications system;

FIG. 3 is a schematic diagram showing the structure of the mobile telephone of FIG. 2;

FIG. 4 is a schematic flowchart illustrating the process of making a mobile telephone call using the mobile telephone of FIGS. 2 and 3;

FIG. 5 is a schematic diagram showing the structure of a request message generated by the mobile telephone of FIG. 2;

FIG. 6 is a schematic diagram showing the structure of a response message received by the mobile telephone of FIG. 2;

FIG. 12 is a diagram illustrating a request message generated by the telephone of FIG. 10;

FIG. 13 is a diagram of a response message received by the telephone of FIG. 11;

FIG. 14 is a flowchart illustrating the process of making a telephone call using the telephone of FIG. 10;

FIG. 15 is a schematic diagram of a telephone having a separate Internet connection;

FIG. 1 represents schematically the manner in which a telephone call is made from a generalised telecommunications device 1 to a call destination 2 via a telecommunications system 3. The telecommunications system 3 is schematically represented as a mesh network in which each of the nodes 4A to 4F is a constituent network. For example, a call may be initially routed via a cable network 4A which is the local network for the user's telecommunications device 1, the call then being routed via network 4B which is a landline network administered by a first carrier, and a third network 4C providing international connection to a further land line network 4D which is local to the call destination 2.

Figure 7:
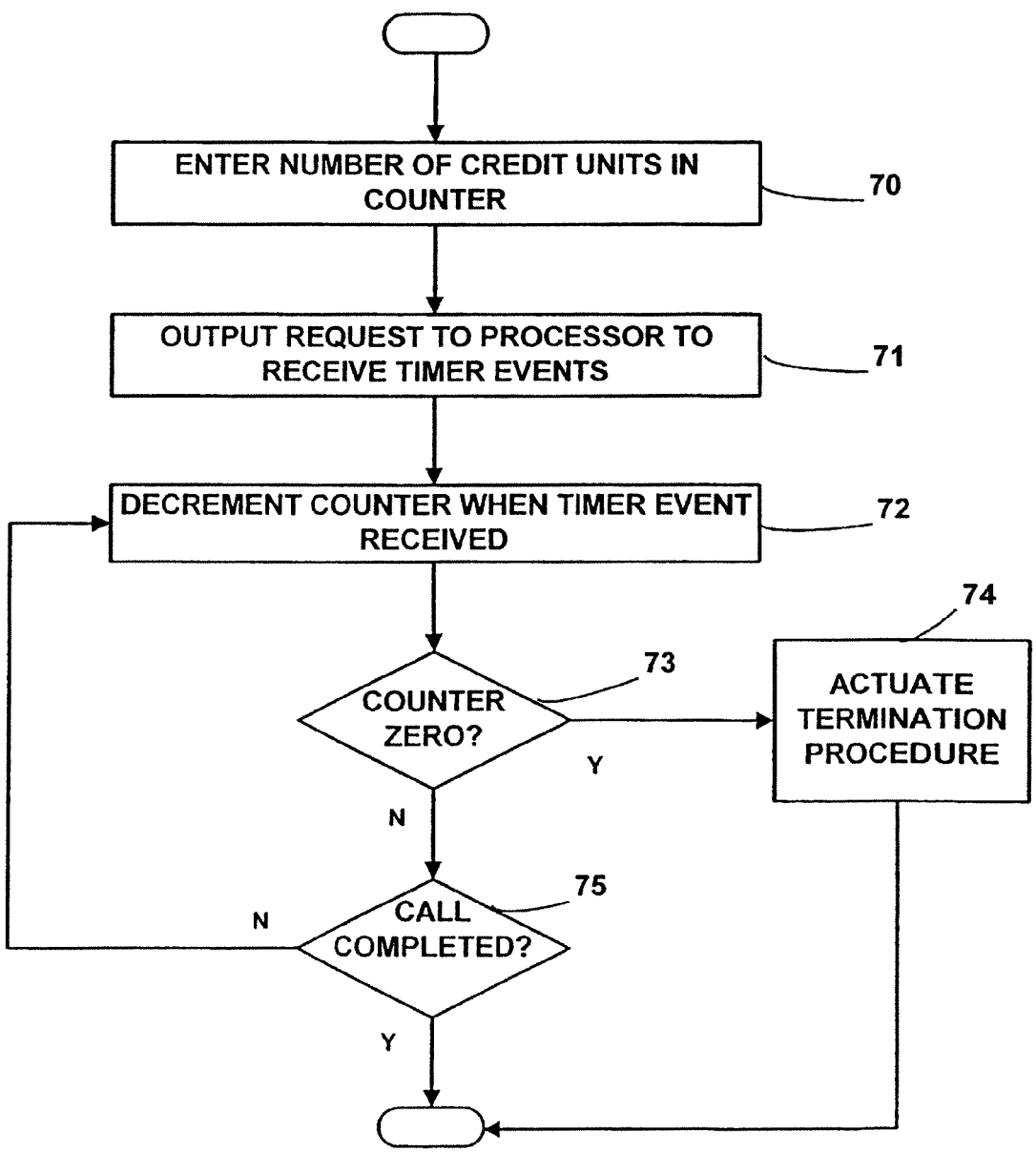
FIG. 7 is a flowchart of a method of controlling call duration.

As represented schematically in FIG. 1, a number of alternative possibilities exist for interconnection between the networks 4A to 4F available within the telecommunications system 3, such networks also including packet switching networks such as the Internet 4E.

An input device 5 associated with the telecommunications device 1 is used by the user to input the call number defining the call destination 2. The input device 5 may be integral with the telecommunications device 1 or may be separate from and connected for communication with the telecommunications device 1 via a connection 6 which, in the case of separate location of the input device 5, could be a transmission line.

A control centre 7 is accessible for communication with the telecommunications device 1 for the exchange of information. In FIG. 1, communication path 8 illustrates the control centre 7 being connected to a node 4F of the telecommunications system 3 so that an exchange of information with the telecommunications device 1 requires a communications session via the cable network 4A and the network of the node 4F.

In use, a user inputs the telephone number of the call destination 2 using the input device 5 and this is received by the telecommunications device 1. The telecommunications device 1 generates a request message which is transmitted to the control centre 7 and contains data representative of the input call number. The request message also identifies the location of the telecommunications device 1 and identifies the user by means of an identification code. The control centre 7 evaluates the received information characterizing the required connection to the call destination 2 and determines a preferred route. A response message is communicated from the control centre 7 to the telecommunications device 1 and includes routing data which allows the device to use a modified telephone call number which, when dialled by the telecommunications device 1, will establish the preferred route via the telecommunications systems 3 to the call destination 2 via a preferred sequence of networks represented in FIG. 1 by nodes 4A to 4F.

The response message also includes any dialling protocol data which may be required, for example when it is necessary to allow a predetermined wait-period to elapse between dialling an initial sequence of digits such as a prefix code and dialling the remaining sequence of digits of the modified telephone number. The dialling protocol data may additionally, if necessary, contain information concerning any handshake procedure to be followed in acquiring access to networks 4A to 4F in the preferred route.

The response message also includes credit data for indicating to the device 1 whether the account status of the subscriber allows the call to be made and, if so, the maximum duration of the call via the preferred route. The control centre 7 obtains the credit data by accessing an account database 11.

The control centre 7 communicates with the networks of the preferred route to generate billing information to debit the subscriber's account. The control centre 7 also monitors the performance characteristics and charging rates required by the nodes 4A to 4F of the telecommunications system 3 in order to maintain an up-to-date routing database 10 to which reference is made by the control centre for determining the preferred route in response to each request message. The control centre 7 also receives payment information to replenish the subscription accounts held in account database 11.

FIG. 2 illustrates an embodiment in which the telecommunications device 1 of FIG. 1 is a mobile telephone 20 and will be described using corresponding references to those of FIG. 1 where appropriate for corresponding elements.

The mobile telephone 20 has a conventional circuit configuration as illustrated schematically in FIG. 3 and is shown to be in wireless communication with a mobile telephone network 21 which is illustrated as constituting a node of the telecommunications system 3. Calls from the mobile telephone 20 may therefore be routed from the mobile telephone network 21 through the telecommunications system 3 to the call destination 2 via number of routes determined by the selection of nodes 4A to 4F.

The control centre 7 is also served by the mobile telephone network 21 for receiving and sending data messages using whatever data message protocol is available to the particular mobile telephone network being utilized.

In the present example, the SMS (Short Message Service) protocol is utilized in a GSM (Global System for Mobile communications) cellular network, enabling the request and response messages to be represented in a text format.

As shown in FIG. 3, the mobile telephone 20 includes a processor 30 connected via a bus 31 to a ROM (read only memory) 32 and a RAM (random access memory) 33. An input device 5 is provided in the form of a keypad integrally formed with the casing of the mobile telephone 20, a display 34 also being provided for the display of dialled numbers and other information.

The mobile telephone 20 also includes a SIM (Subscriber Identification Module) card 35 storing data specific to the individual mobile telephone and user. The SIM card 35 also stores programs for data management, data retrieval, message generation and call duration control, as described in detail below. The SIM Toolkit Application Interface is implemented in the SIM card 35, the SIM Toolkit being an emerging standard in SIM development. SIM Toolkit compliant applications may be stored in the SIM card 35 in either flash memory, ROM or masked ROM.

An internal clock 36 is also provided together with an audio processor circuit 37 and microphone and speaker circuit 38.

A transmit and receive circuit 39 controlled by the processor 3 is connected to an antenna 310.

The RAM 33 includes a buffer memory 90, the use of-which will be described below.

In FIG. 2, the mobile telephone 20 is shown connected to the generalised mobile network 21. It is to be understood however that the generalised mobile network 21 may comprise any number of networks of distinct service providers having shared or separate base stations and hardware and that the control centre 7 is able to send and receive messages via any of such service providers. The user of a given mobile telephone 20 may in practice only have access only to a single service provider of the mobile network 21 or alternatively the user may have access to a plurality of such service providers under a roaming agreement which allows the user to make use of whichever service provider network is available in the geographical location of "the mobile telephone, or to allow the user to be selective where more than one service provider is able to provide network coverage at a given location.

Typically therefore, the mobile telephone 20 stores in the SIM card 35 a forbidden network table 3400 and a preferred network table 3401 as shown in FIG. 3. The mobile telephone 20 needs to register with a service provider before any communication is possible and the tables 3400 and 3401 are referred to before completing the registration process, firstly to prevent registration with any network with which the subscriber is barred from registration, and secondly to select the preferred network in a case where more than one service provider is available at a given location.

The manner in which the mobile telephone 20 is utilized is illustrated schematically in the flowchart of FIG. 4.

At step 40, the mobile telephone 20 is turned on and registers with a service provider of the mobile network 21. If necessary, the user may assist in the selection of the service provider to be used for the making of a telephone call by operating a selection function of the mobile telephone 20.

When the user requires to make a telephone call, the user inputs at step 41 the call destination number using the input device 5 and presses a send key of the input device 5 of mobile telephone 20. The mobile telephone 20 stores the input number in the buffer memory 90 in RAM 33 at step 42 and generates a request message as illustrated schematically in FIG. 5. In the present example, the request message is in the SMS format and comprises a header 51, the input number 52 corresponding to the telephone number of the call destination, location information 53, identification data 54 which identifies the service provider with which the mobile telephone is registered and via which the call is to be made, and a PIN (Personal Identification Number) number 55 which identifies the user. The process of generating the request message is implemented using an application stored in the SIM card 35.

The processor 30 controls the operation of the mobile telephone 20 to send at step 43 the request message in SMS format to the control centre 7 via the mobile telephone network 21.

At step 44, the control centre 7 responds by sending a response message to the mobile telephone 20, the response message having the structure illustrated schematically in FIG. 6. The response message in SMS format consists of a header 61, routing data 62 defining a preferred telephone call number for directing a call to the call destination 2 via a preferred route determined by the control centre 7, dialling protocol data 63 containing information required to correctly implement the preferred telephone number, and credit data 64 which indicates whether the user's account has credit and, if so, the maximum call duration to be permitted via the preferred route. The response message also includes updating information 65 for updating data stored in the SIM card 35. This information includes the forbidden network table 3400 and the preferred network table 3401. Receiving this updating information 65 thereby enables the control centre 7 to reconfigure the operating parameters of the mobile telephone 20 including the manner in which the service provider is selected at the time of registration in accordance with the tables 3400 and 3401.

At step 45 in FIG. 4, the mobile telephone 20 receives an SMS message which it determines to be a response message from the control centre 7 by decoding the header 61 and processes the response message in a manner which inhibits display of the SMS message on the display 34.

At step 46, an application in the SIM card takes control of the initiation and termination of the telephone call and determines from the response message whether any call credit exists. If no credit exists, or the available credit is less than a predetermined threshold level, the call is not initiated and a message to this effect is generated and displayed to the user. If sufficient call credit does exist, the telephone at step 47 initiates the dialling of the preferred number indicated in the response message and at step 48 monitors the duration of the call, repeatedly comparing the elapsed duration of the call at step 49 against the remaining credit.

If the elapsed call duration consumes the available remaining credit, the call is terminated at step 410, the call otherwise continuing until completed by the user or called party at step 411.

At step 47, the mobile telephone 20 initiates the telephone call by making an outgoing call via the service provider of the mobile telephone network 21 using the routing data 62 contained in the response message corresponding to the input number 52. The routing data 62 may simply comprise the full digits of the preferred number. Alternatively, the routing data may comprise a prefix code to be added to the input telephone number stored in the buffer memory 90 by the processor 30. Similarly, the routing data may comprise instructions for changing digits of the input telephone number, or an instruction for the input telephone number to be used without modification.

The steps indicated in FIG. 4 are preferably implemented by the SIM card 35 but may alternatively be controlled by a computer program operated by the processor 30. The program may therefore be stored in the SIM card 35 or in the ROM 32. Alternatively, the computer program may be downloaded into the ROM 32 or RAM 33 via a suitable data input from an external device which receives the program in the form of a computer readable medium such as a compact disc, DVD, or floppy disc, or which alternatively receives the program as a signal transmitted via a network such as the Internet. Alternatively, the mobile telephone 20 may have a reader for receiving the input of a program, for example in the form of a smart card reader for extracting the program code from a smart card.

Figure 9:
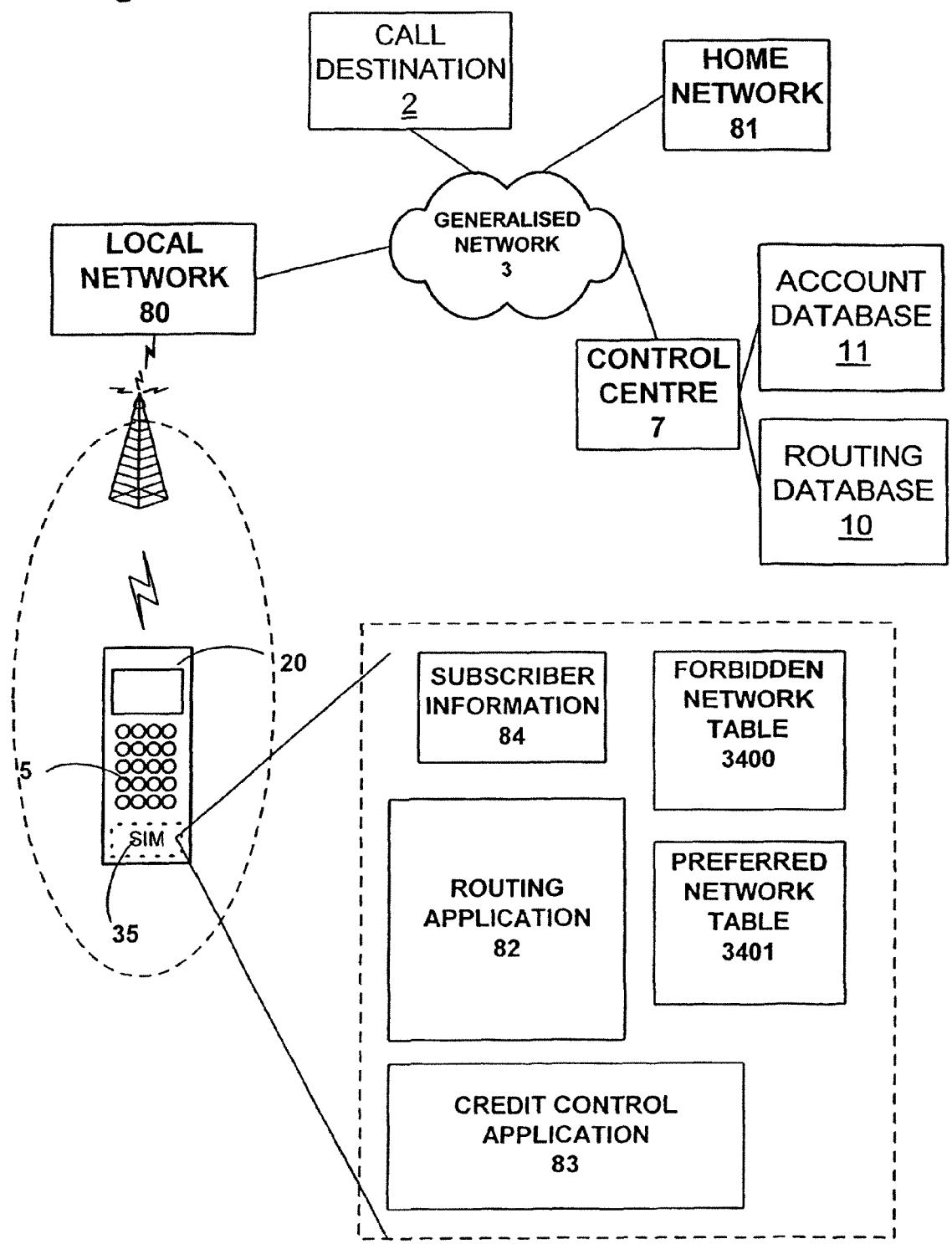
FIG. 9 is a schematic diagram illustrating mobile telephone operation.

In the above example, the following numerical data further illustrates the specific detail of calling the call destination 2 as further illustrated in FIG. 9.

FIG. 9 illustrates mobile telephone 20 in a roaming situation in which it is registered with a local network 80 which is different from a home network 81 with which the user has an account administered by control centre 7.

The mobile telephone 20 is shown to contain SIM card 35 which includes a routing application 82 for applying the routing data 62 contained in response messages and a credit control application 83 for controlling the initiation and maximum duration of calls in accordance with the received credit data 64. The SIM card 35 also stores subscriber information 84.

In this example, the user is a customer of Vodafone (Trademark), a service provider of mobile telephone networks which provides the home network 81, but the user is utilizing a roaming agreement to make use of the local network 80 operated by another service provider France Telecom (Trademark) while the user and device 1 are located in France. The user wishes to make a telephone call to a destination defined by call destination number 001907123456 and enters this number using the keypad or other input device 5 of the mobile telephone 20.

The user then presses the send button of the mobile telephone 20. The mobile telephone 20 transmits a message containing the telephone number and subscriber information 84 using the SMS format to the control centre 7 which responds by transmitting a response message in which the routing data 62 defines the preferred telephone number to be 08008887770019071234556.

The mobile telephone 20 receives this SMS message and determines that the SMS message is from the control centre 7 and is therefore not to be displayed on the display 34. The processor 30 stores the response message in memory.

Whether or not a call can be made is determined from the call credit indicated in the response message and, if sufficient credit exists, mobile telephone 20 then reads the routing data from memory and generates an outgoing call in which the preferred number is dialled using the protocol information 63, if any.

Call duration is monitored as described above with reference to step 48 and the call is terminated either when credit expires or when the user determines that the call is completed.

application can monitor the duration of a call in the case of a mobile telephone 20 which does not include a clock 36 capable of outputting to the SIM card 35 a signal representative of the absolute time.

FIG. 7 illustrates the manner in which the SIM card application can monitor the duration of a call in the case of a mobile telephone 20 which does not include a clock 36 capable of outputting to the SIM card 35 a signal representative of the absolute time.

In this instance, the credit data 64 included in the response message is provided in the form of a number of credit units, each of which corresponds to a duration of time corresponding to an interval between timer events which may be output by the microprocessor 30 for receipt by the SIM card 35.

At step 70, the number of credit units received in the response message is entered into a counter in the SIM card 35 and at step 71 the SIM card outputs a request to the processor 30 to receive timer events.

At step 72, the counter is decremented at each receipt of a timer event signal from the microprocessor 30. At step 73, it is determined whether the counter has zero remaining credit units and, if so, the termination procedure is actuated at step 74 to terminate the call.

If the counter continues to have remaining credit units, the process continues until the call is completed at step 75.

Figure 8:
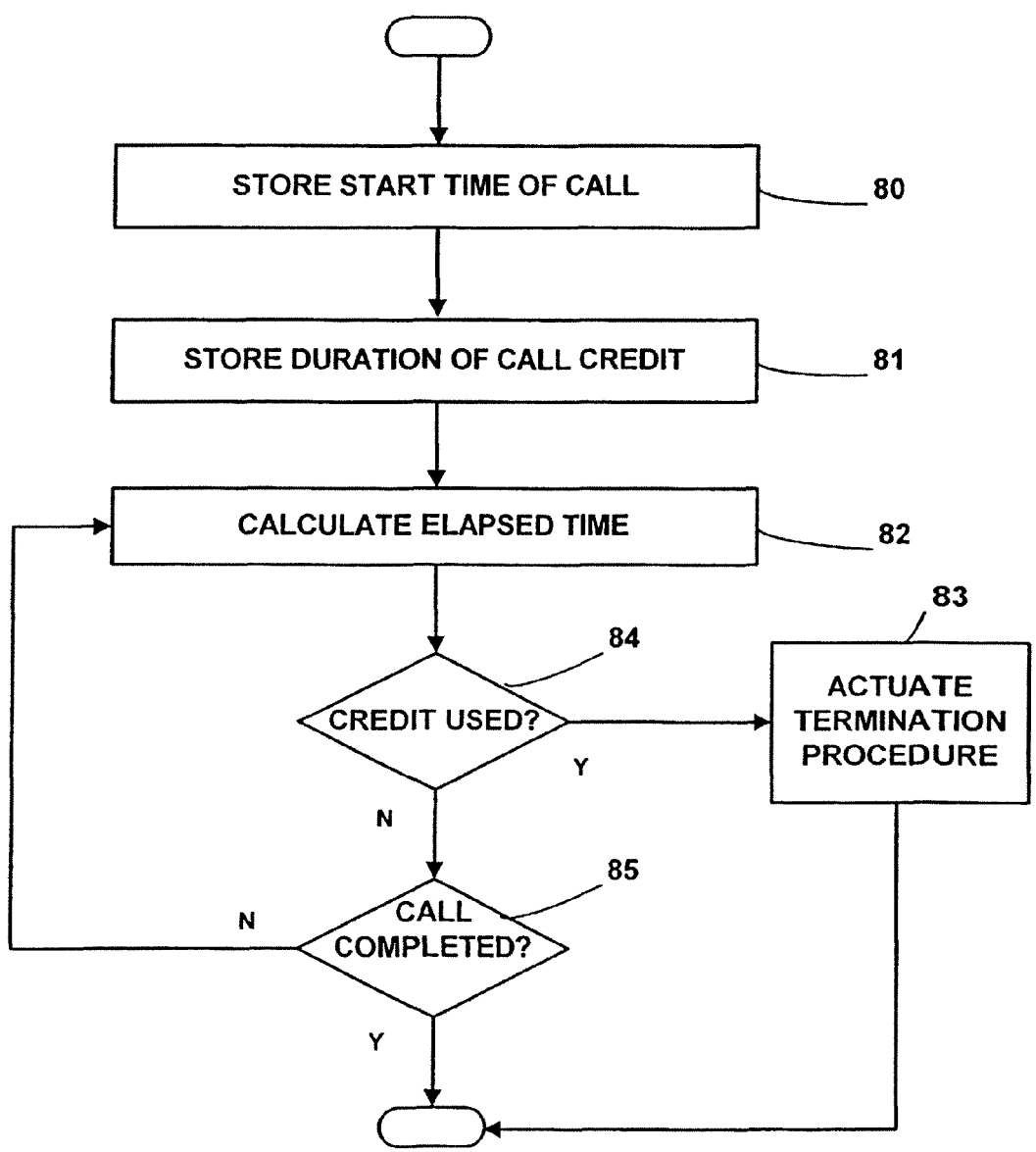
FIG. 8 is a flowchart of a further method of controlling call duration.

FIG. 8 illustrates steps of an alternative method when the microprocessor 30 is able to output a signal representative of the absolute time. At step 80, the start time of the telephone call is stored in a temporary memory location in the SIM card 35 and at step 81, the duration of call credit in minutes and seconds is entered into a further memory in the SIM card. At step 82, the received time signal from the microprocessor 30 is used to calculate the elapsed time since the start of the call and at step 84 is determined whether the available time credit has been consumed. If so, the termination procedure is actuated at step 83 to terminate the call. Alternatively, the call continues until terminated by the user at step 85.

A further embodiment will now be described with reference to FIG. 10 using corresponding reference numerals to those of preceding figures where appropriate for corresponding elements.

Figure 10:
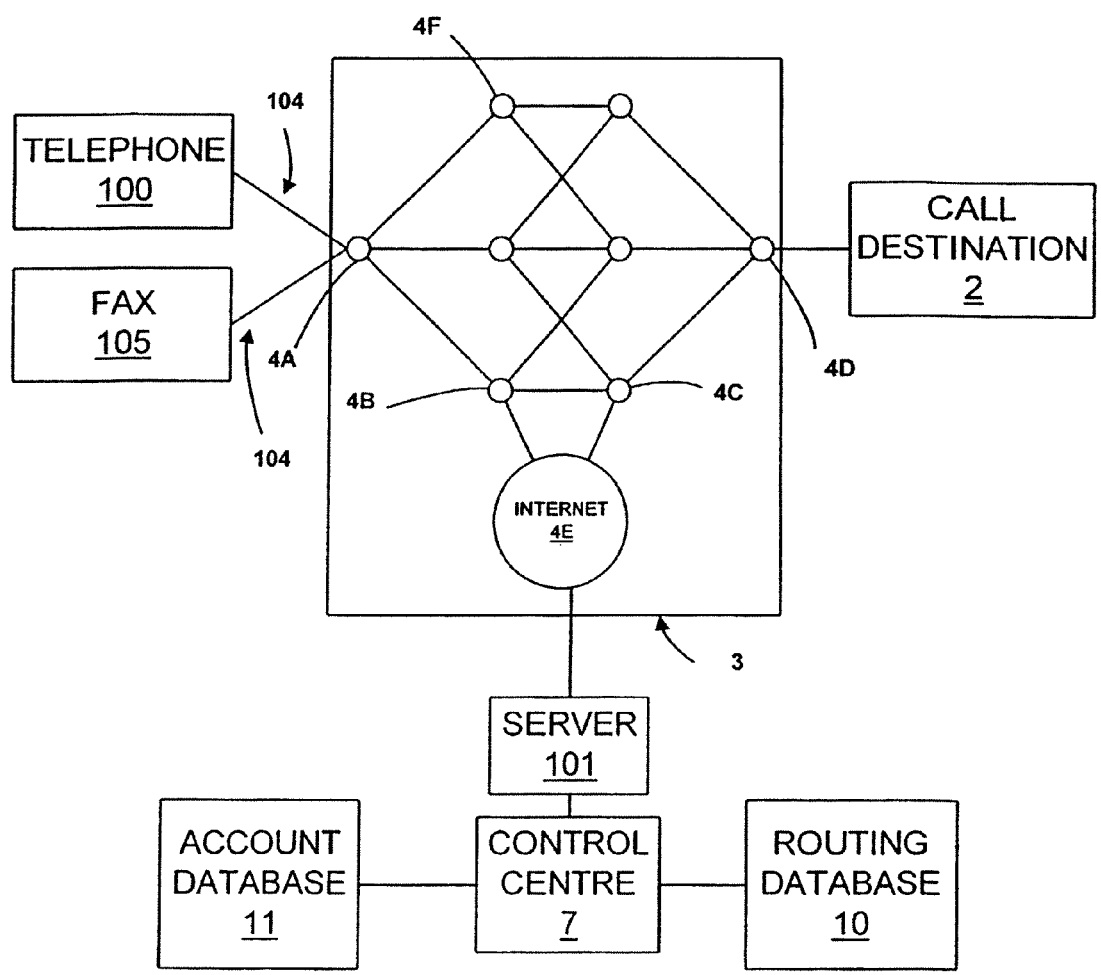
FIG. 10 is a schematic diagram illustrating a telephone connected to a call destination via a telecommunications system.

In FIG. 10, a telecommunications device is constituted by a telephone 100 which is connected to a local exchange 4A of a telecommunications system 3 and is used by a user to make a telephone call to a call destination 2. A control centre 7 has a server 101 accessible via the Internet 4E which is in the present example regarded as a constituent network of the telecommunications system 3.

Figure 11:
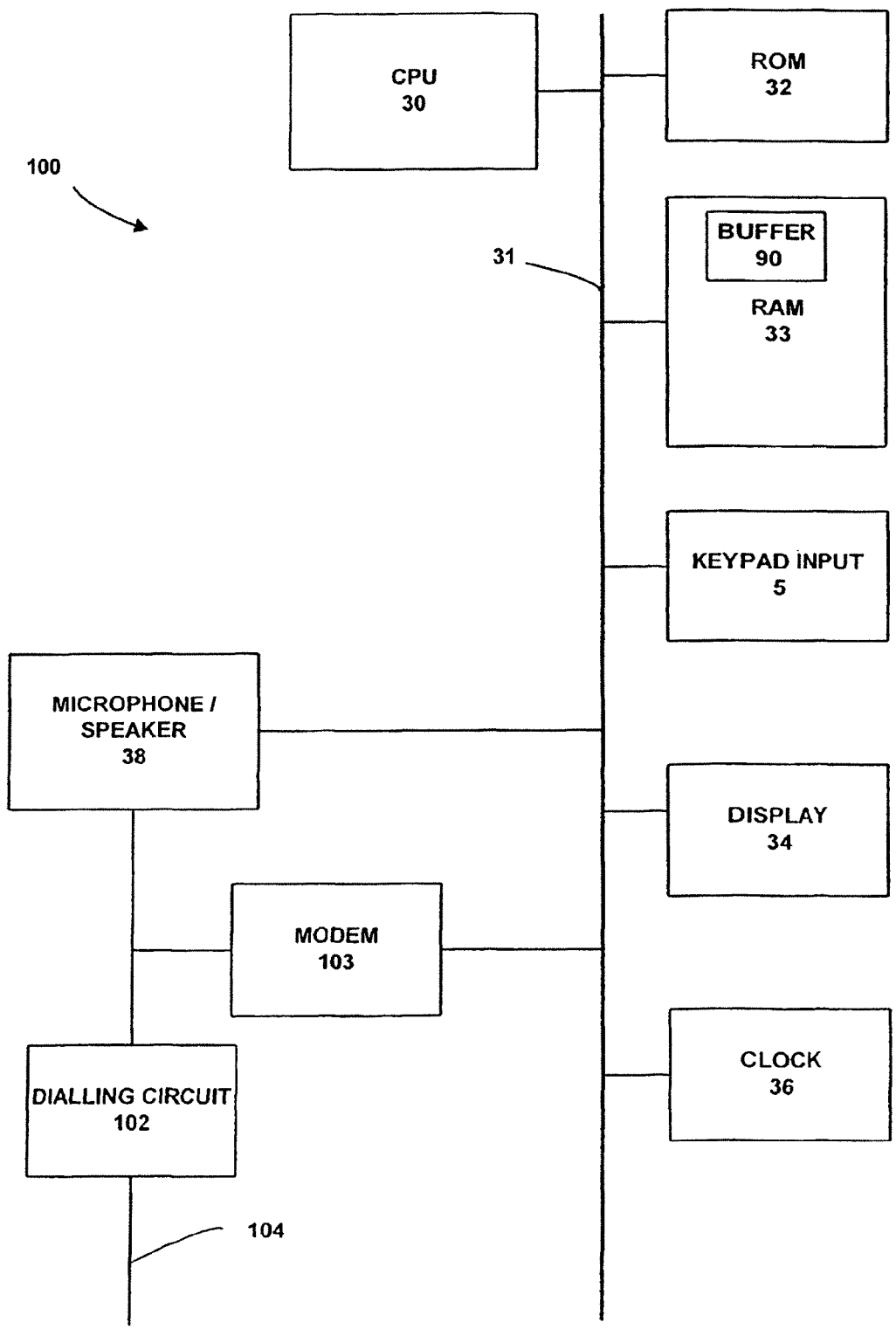
FIG. 11 is a schematic diagram of the components of the telephone of FIG. 10.

The structure of the telephone 100 is illustrated schematically in FIG. 11 which shows a processor 30 connected via a databus 31 to a ROM 32, a RAM 33 including a buffer memory 90, a keypad input device 5, a display 34 and an internal clock 36. The telephone 100 also includes a microphone and speaker circuit 38, a dialling circuit 102 and a modem 103, each of which is connected to a telephone line 104.

The process of making a telephone call from the telephone 100 is illustrated in the flowchart of FIG. 14.

When a user inputs at step 140 the telephone number of a call destination 2 using the keypad input device 5, the processor 30 stores at step 141 the number in the buffer memory 90 in RAM 33 and generates at step 142 a request message having the format shown in FIG. 12.

The request message comprises a header 120, the input dialled number 121, location details 122 and a PIN number 123 identifying the user.

An outgoing call is generated by operating at step 143 the dialling circuit 102 which outputs a telephone call via line 104 to the telecommunications system 3, dialling the telephone number of an ISP (Internet Service Provider) which gains access to the Internet 4E. The URL (Uniform Resource Locator) corresponding to the server of the control centre 7 is communicated to the ISP via the modem 103 and two-way communication is established with the control centre. A response message is generated by the control centre 7 in the form shown in FIG. 13 and the response message is transmitted at step 144 by the control centre and received at step 145 via the modem 103 to be stored at step 146 by the processor 30 in the RAM 33.

The response message comprises a header 130, routing data 131 and dialling protocol data 132 together with credit data 133.

The CPU 30 also terminates at step 145 the communication session via the Internet 4E by controlling the modem 103 and dialling circuit 102. At step 1446 the CPU 30 determines from the received response message whether any call credit exists and, if so, initiates at step 147 a new telephone call via the dialling circuit 102 using the modified telephone number 131. The connection is then established with the call destination 2 and the microphone and speaker circuit 38 is enabled to allow telephone conversation to proceed between the user and the call destination 2.

The duration of the call is monitored at step 1447, a decision being made at step 1448 to terminate 1500 the call if the available call credit is consumed, the call otherwise continuing until completed by the user at step 1449.

The microphone and speaker circuit 38 may optionally include a tone generating circuit to provide a comfort tone to the user during the period in which the processor 30 communicates with the control centre 7 via the Internet 4E and modem 103.

The arrangement of FIGS. 11, 12 and 13 may similarly be applied to operation of a facsimile machine 105 as illustrated in FIG. 10, the microphone and speaker circuit 38 of FIG. 11 being replaced or supplemented by appropriate scanning and facsimile signal generating circuits.

The embodiment of FIG. 10 may be modified as illustrated in FIG. 15 by providing the telephone 100 with a separate communication path 140 for connection to the Internet 4E. This communication path 140 may be provided for example by connection to a cable network 4G via a data channel which is separate and distinct from the telephone line 104.

Use of the telephone 100 of FIG. 15 differs from the process outlined in FIG. 14 in that, at step 143, the access to the control centre 7 is made via the separate communication path 140. At step 145, connection with the control centre 7 via the separate communication path 140 is terminated. At step 147, the new telephone connection is made via the telephone line 104 in the normal manner.

A further embodiment will now be described with reference to FIG. 16 using corresponding reference numerals to those of preceding figures where appropriate for corresponding elements.

Figure 16:
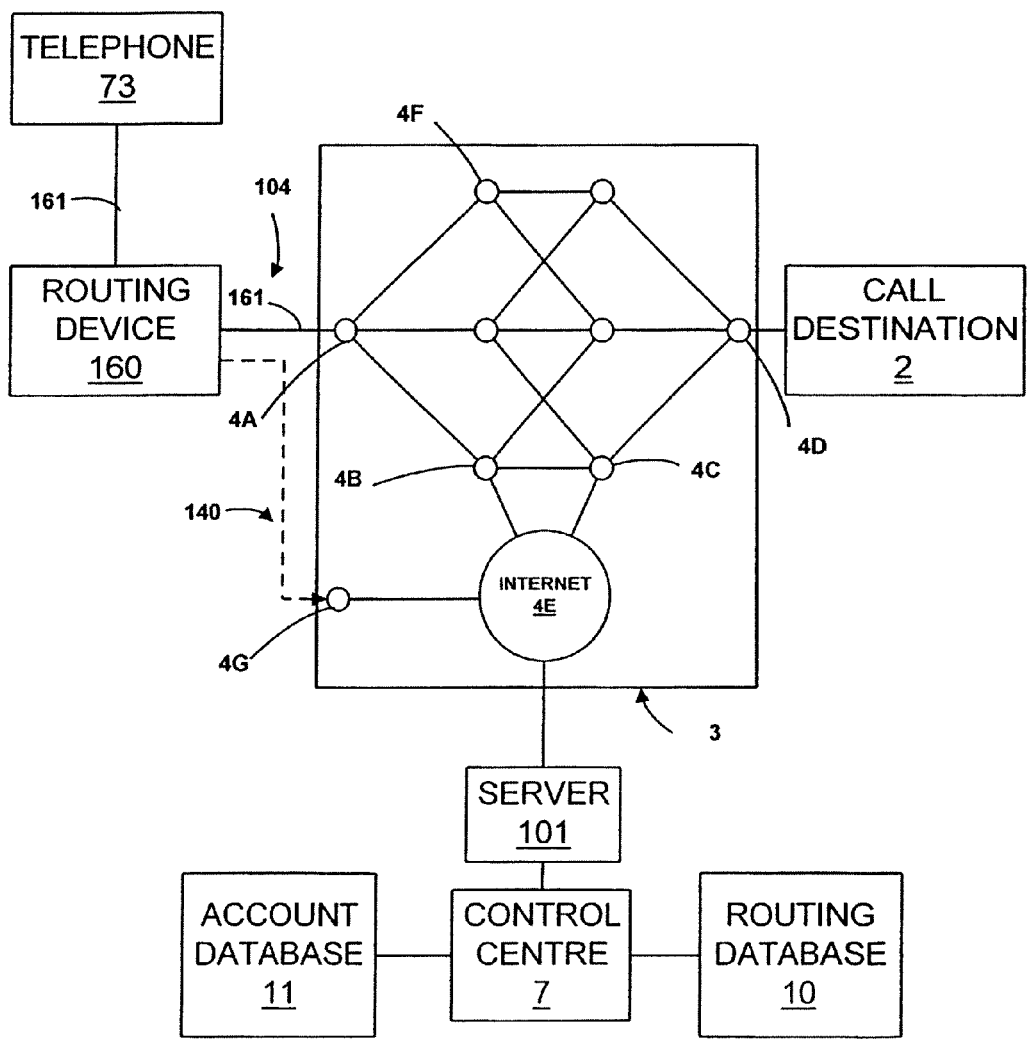
FIG. 16 is a schematic diagram of a routing device used for routing calls between a telephone and a call destination.

The embodiment of FIG. 16 comprises a stand alone routing device 160 connected in series between a conventional telephone 73 and the services of a local network 4A of a telecommunications system 3. Typically, in a domestic household situation, the routing device 160 will have a socket into which the telephone lead 161 is received and will have an output telephone lead 162 connected to a standard wall socket for connection to the local network 4A.

Figure 17:
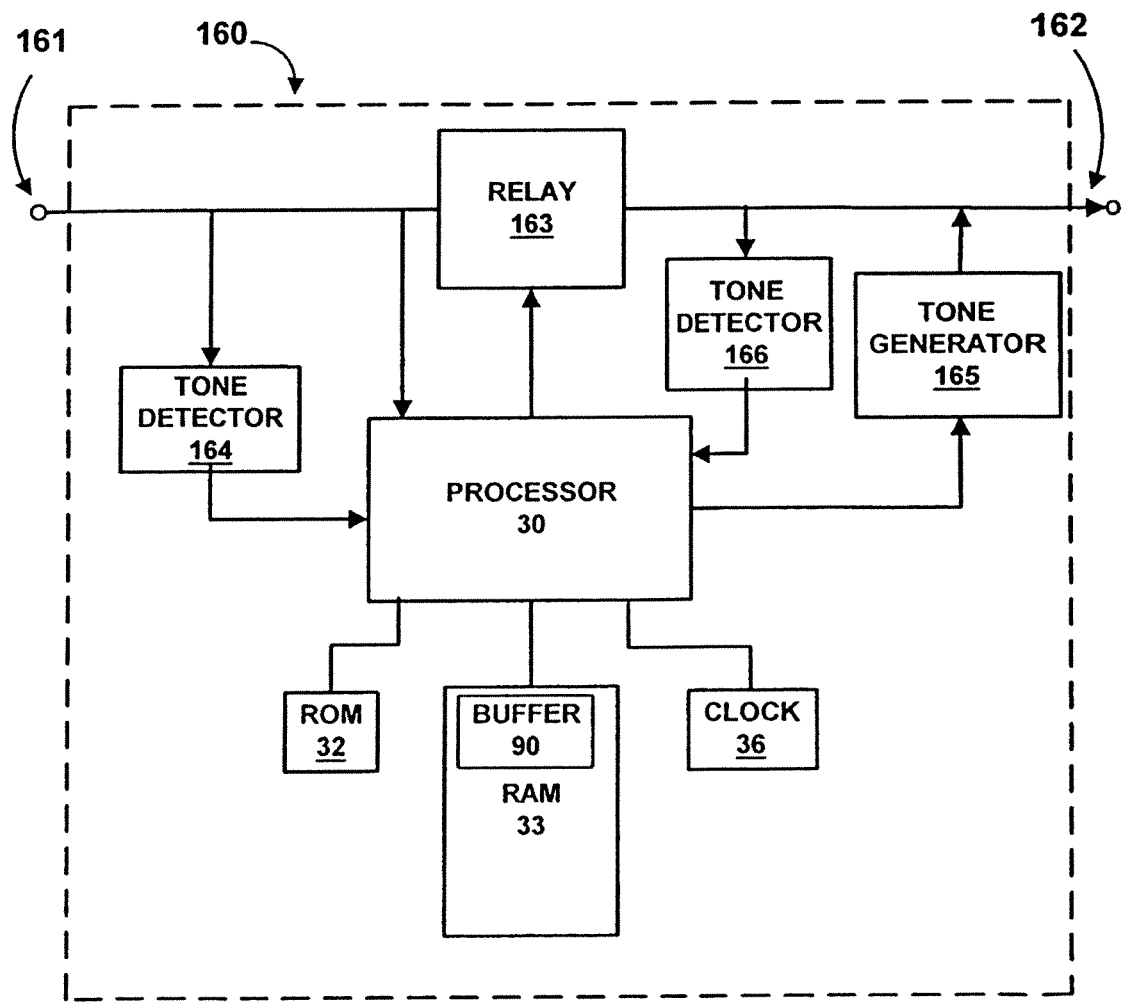
FIG. 17 is a schematic diagram of the structure of the routing device of FIG. 16.

FIG. 17 illustrates schematically the structure of the routing device 160. The device 160 in FIG. 17 includes a relay 163 operable to selectively interrupt connection between the input telephone line 161 and output telephone line 162. When a telephone call is initiated, the relay 163 is opened and the telephone number dialled by the telephone 73 is detected by means of a tone detector circuit 164. The routing device 160 includes a processor 30, a ROM 32, a RAM 33 including a buffer 90 and an internal clock 36. The processor 30 is connected to the tone detector circuit 164 and responds to the received telephone number corresponding to the call destination 2 by storing the number in buffer memory 90 and generating a request message in the manner described above with reference to previous embodiments.

An outgoing call is generated on the line 162 using a tone generator 165 and received incoming messages from the control centre 7 are detected by means of a further tone detector 166 whose output is connected to the processor 30.

The processor 30, after receiving a response message containing routing data 62 defining a preferred telephone number and credit data 64, follow steps corresponding to steps 46 to 411 described above with reference to FIG. 4. When dialling the preferred number, the processor 30 uses the tone generator 165 and connects the telephone 73 to the call destination 2 by closing the relay 163 once connection is made.

The processor 30 of the routing device 160 is programmed to perform in a similar manner to the processors of preceding embodiments with respect to the use of buffer memory 90 for obtaining the preferred telephone number.

The routing device 160 may be utilized in routing calls from facsimile machines or other devices substituted for the telephone 100 of FIG. 16.

As indicated by the broken line 140 in FIG. 16, the routing device 160 may alternatively be provided with a separate connection for Internet access.

Figure 18:
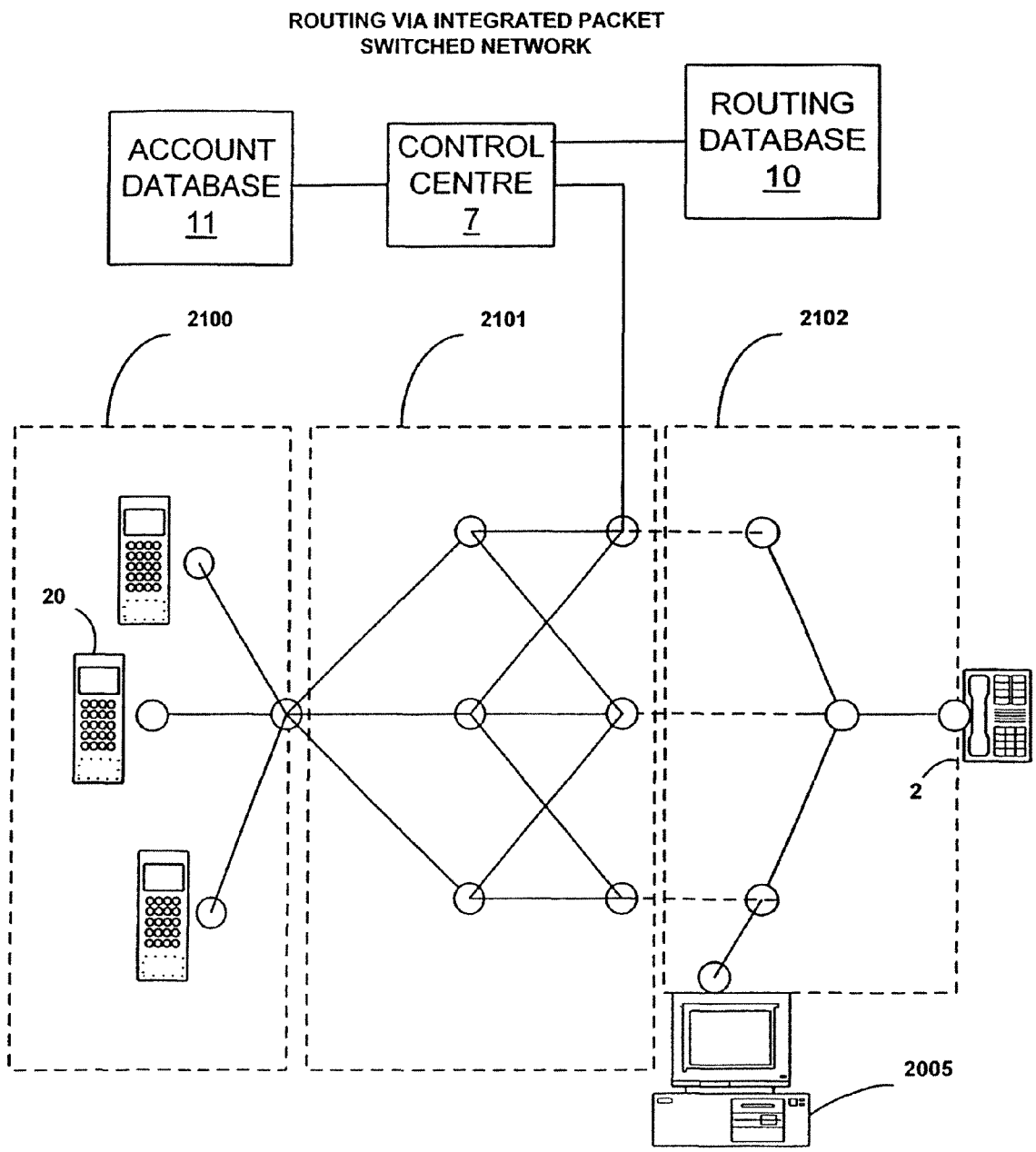
FIG. 18 is an illustration of routing via an integrated packet switched network.

FIG. 18 illustrates schematically the manner in which the present invention has application to communication systems in which packet switching techniques are universally applied. In FIG. 18, a packet switching network includes a region 2100 which corresponds to a cellular network system in which mobile telephones 20 are operable, the system including an air interface, and in which each of a number of mobile telephones 20 constitute nodes of the packet switching network. A further region 2101 of the network may be constituted either by the public service telephone network or the Internet or a combination thereof and a remaining portion 2102 provides local connection to the call destination 2, illustrated as a telephone 2 or to a personal computer 2005. The portion 2102 may for example be a cable network or another form of network which is equivalent in effect to a local exchange 4D of FIG. 1.

In a packet switched network such as illustrated in FIG. 18, the notion of a dialled telephone number may be replaced by a network address such as a URL. Alternatively, the destination of a call may be defined using either a telephone number or URL depending on the nature of the destination and the type of data to be transmitted.

When making a call from mobile telephone 20 to destination 2 or 2005, the above described method of communicating with a control centre 7 using request and response messages is utilized to select the preferred route.

The above embodiments may be modified in accordance with the present invention to apply credit control to an account other than a prepaid subscription account under circumstances where a subscriber is allowed to make post payment for calls which have already been made, up to an account limit determined by the account holder. The credit data in these circumstances may therefore be utilized to prevent further calls being made once the account limit has been reached and to interrupt calls which consume totally the amount of remaining credit within the account limit. The control centre in these circumstances similarly transmits information defining the remaining credit in terms of time interval or credit units.

In further embodiments, the region 2100 of FIG. 20 may be an alternative network structure servicing landline telephones or other terminals such as facsimile machines or personal computers.

The mobile telephone 20 described above may utilize hardware corresponding to an existing mobile telephone. Alternatively, an existing mobile telephone may be modified to include an increased area of RAM in order to accommodate additional program and memory requirements.

The generalised telecommunications device 1 of FIG. 1 may be a telephone, facsimile machine or computer apparatus equipped with a modem, or any device capable of initiating or handling telephone calls including data calls. The present invention therefore encompasses the use of devices which are hybrid devices and those devices not expressly described in the above description but capable of achieving the above function.

In the above described embodiments, the request message includes information identifying the location of the device. Alternatively, the control centre 7 may obtain such information by other means such as for example call line information obtained when the request message is received by a telephone connection.

In each of the above described embodiments and the alternative arrangements discussed herein, the processor is controlled by a computer program stored in memory and initially loaded from a computer readable medium such as a compact disc or floppy disc.

Alternatively, the program may be communicated in the form of a signal transmitted by a communications channel to the device. The present invention includes a computer program, medium and signal containing processor implementable instructions for carrying out the above described methods of performing the invention.

The transmission of request and response messages has been described above in the examples using SMS format. Alternatively, the USSD (Unstructured Supplementary Service Data) protocol may be utilized. Alternative protocols for such message transmission include GPRS (General Packet Radio Service) transmissions which provides speeds of up to 150 kilobits per second. Each of the above described embodiments may therefore be modified to include the GPRS protocol for message transmission. Further alternatives are the use of UMTS (Universal Mobile Telecommunications System) data packages and TCP/IP messages.

Reference is made above to the use of an identification code contained in the request message and serving to identify the user to the control centre 7. The identification code may be generated automatically from stored information in the device or may, alternatively, be generated from a PIN number entered by the user using the input device 5. The PIN number may, alternatively, be required to be entered in addition to the use of the identification code stored in the device 1.

The embodiment of FIGS. 2-6 which describes operation of a mobile telephone may be modified to comprise a computer apparatus such as a PDA (Personal Digital Assistant) capable of being connected to a mobile telephone network for data transfer or Internet connection.

In each of the above described embodiments, the buffer memory may also be used to temporarily store the preferred telephone number prior to the device using the number to dial the outgoing call.

In the above described embodiments, the making of a call is initiated by input of a dialled number or a network address by a user. Each of the above embodiments may be modified to include the input of a called number or network address from a memory, including for example memories which are accessed as a phonebook by referring to key words or by the input of voice commands using a speech recognition circuit. Alternatively, a terminal may receive the dialled number or network address from an external source such as a personal computer.

In each of the above described embodiments, the messages communicated between the control centre 7 and the terminal 1 may be encrypted. An encryption application stored in the terminal 1 may thereby be provided with encryption keys stored internally. The stored encryption keys may be updated periodically by including new keys in the updating information 65 contained in the response message.

When utilizing the routing information provided from the control centre 7, the terminal 1 in many cases will simply add a prefix to the numbers input by the user. In some instances however it will be necessary to replace some or all of the dialled numbers with new numbers generated in accordance with the 'routing information. For example, if the dialled number is 0044 163538774, the routing information may require that the actual output number consists of 182, a pause for two seconds, followed by the remaining digits 44163538774. By removing the "00" digits at the start of the dialled number, the dialled number is made to comply with a requirement by a service provider to omit leading zeroes.

In the above description, references to dialling and dialling means are to be understood where appropriate to include outputting signals for initiating communication via a telecommunications system in whatever form is appropriate to the system and its protocols.

The invention claimed is:

1. An end-user device configured to communicate with a call destination via a telecommunications system using a credit controlled subscription account, the end-user device comprising:
    an input unit configured to receive input data defining the call destination directly from an end-user;
    a message generating unit configured to generate a request message including the input data;
    an output unit configured to output the request message to a control center;
    a receiving unit configured to receive from the control center a response message including routing data defining a preferred route for routing a call from the end-user device to the call destination via the telecommunications system and credit data representative of remaining credit within an account limit of the subscription account;
    an initiating unit configured to initiate a communication, originating at the end-user device and terminating at the call destination, using the routing data; and
    a credit control unit configured to control the duration of the communication in accordance with the credit data.

2. The end-user device as claimed in claim 1, wherein the credit control unit is configured to prevent initiation of the communication with the call destination if the credit data is representative of a minimum value credit remaining in the account.

3. The end-user device as claimed in claim 1, wherein the receiving unit is configured to receive credit data that is representative of a maximum call duration corresponding to the remaining credit in the account, and wherein the end-user device includes a terminating unit configured to terminate the communication with the call destination when the maximum call duration has elapsed.

4. The end-user device as claimed in claim 3, wherein the terminating unit is configured to calculate an elapsed time measured from the start of the communication with the call destination as indicated by a clock of the end-user device, and wherein the end-user device includes a determining unit configured to determine when the elapsed time reaches the maximum call duration.

5. The end-user device as claimed in claim 3, wherein the receiving unit is configured to receive credit data that includes a value representing a number of units determined by the control center, the terminating unit is configured to measure a time interval corresponding to one unit, the end-user device further comprising:
    a counter unit configured to count said intervals from the start of the communication with the call destination; and
    a determining unit configured to determine when the number of intervals equals the number of units.

6. The end-user device as claimed in claim 1, wherein the input unit is configured to receive the input data that includes a telephone number of the call destination, wherein the receiving unit is configured to receive the routing data that is representative of at least part of a preferred telephone number defining the preferred route, and wherein the initiating unit is configured to initiate the communication using the preferred telephone number.

7. The end-user device as claimed in claim 6, wherein the receiving unit is configured to receive the routing data that is representative of the entire preferred telephone number for use by the initiating unit.

8. The end-user device as claimed in claim 6, wherein the receiving unit is configured to receive the routing data that is representative of a prefix code, and wherein the initiating unit is configured to add the prefix code to the input telephone number to obtain the preferred telephone number.

9. The end-user device as claimed in claim 1, wherein the receiving unit is configured to receive the response message that includes protocol information, and wherein the initiating unit is responsive to the protocol information when initiating the communication with the call destination using the routing data.

10. The end-user device as claimed in claim 9, wherein the receiving unit is configured to receive the protocol information that defines a wait period to be inserted between outputting an initial portion and a remaining portion of the preferred telephone number.

11. The end-user device as claimed in claim 1, wherein the input unit is configured to receive the input data that includes a network address of the call destination.

12. The end-user device as claimed in claim 1, further comprising:
 a storage unit configured to store identification information for identifying the end-user device to the control center, and
 wherein the message generating unit is configured to include the identification information in the request message.

13. The end-user device as claimed in claim 1, wherein the initiating unit is configured to initiate the communication with the control center whereby the output unit is configured to output the request message via the telecommunications system.

14. The end-user device as claimed in claim 1, wherein the output unit is configured to output the request message using a first communications channel which is separate and distinct from a second communications channel used by the initiating unit.

15. The end-user device as claimed in claim 14, wherein the first communications channel comprises one of:
 (a) the Internet;
 (b) a public data network; and
 (c) a private data network.

16. The end-user device as claimed in claim 1, wherein the end-user device is a telecommunications terminal, and
 wherein the input unit includes a keypad for the input of the input data by a user.

17. The end-user device as claimed in claim 14, further comprising:
 a mobile telephone for wireless communication with a mobile telephone network of the telecommunications system.

18. The end-user device as claimed in claim 15, wherein the output unit is configured to output the request message in a text message format corresponding to a text message protocol of the mobile telephone network.

19. The end-user device as claimed in claim 17, wherein the receiving unit is configured to receive the response message in a text message format corresponding to a text message protocol of the mobile telephone network, and
 wherein the mobile telephone is operable to inhibit display to the user of text corresponding to the response message.

20. The end-user device as claimed in claim 17, further comprising:
 an updating unit configured to update at least one of a preferred network table and a barred network table using updating information contained in the response message.

21. The end-user device as claimed in claim 17, wherein the credit control unit includes an application processed by a SIM card of the mobile telephone.

22. The end-user device as claimed in claim 16, wherein the end-user device is constituted by a telephone for land line communication.

23. The end-user device as claimed in claim 16, wherein the end-user device is a facsimile machine.

24. The end-user device as claimed in claim 16, wherein the end-user device is a computer apparatus having a modem.

25. The end-user device as claimed in claim 1, wherein the end-user device is an interface apparatus including a connection unit configured to connect to at least one user operable terminal, and
 wherein the input unit is operable to receive the input data via the connection unit from the user operable terminal.

26. The end-user device as claimed in claim 25, wherein the end-user device is a routing device including a connection unit configured to connect to a user operable terminal, and
 wherein the input unit is operable to receive the input telephone number via the connection unit.

27. The end-user device as claimed in claim 22, further comprising:
 an interface module configured to communicate with a local area network to which the control center is connected in use.

28. The end-user device as claimed in claim 1, wherein the receiving unit is configured to receive the credit data representative of remaining credit within an account limit of the subscription account that is a prepaid subscription account, and
 wherein the receiving unit is configured to receive the credit data representative of remaining credit that corresponds to call charges for which prepayment has been made.

29. A method of operating an end-user device configured to communicate with a call destination via a telecommunications system using a credit controlled subscription account, the method comprising:
 receiving an input telephone number defining the call destination directly from an end-user;
 generating a request message including data representative of the input telephone number;
 outputting the request message to a control center;
 receiving a response message from the control center, the response message including routing data defining a preferred route for routing a call from the end-user device to the call destination via the telecommunications system and credit data representative of remaining credit within an account limit of the subscription account;
 initiating a telephone call connection, originating at the end-user device and terminating at the call destination, using the routing data; and
 controlling the duration of the call in accordance with the credit data.

30. The method as claimed in claim 29, further comprising:
 preventing initiation of the telephone call connection with the call destination if the credit data is representative of a minimum value credit remaining in the account.

31. The method as claimed in claim 29, wherein the credit data is representative of a maximum call duration corresponding to the remaining credit in the account and wherein the method comprises terminating the telephone call connection with the call destination when the maximum call duration has elapsed.

32. The method as claimed in claim 31, wherein the terminating step comprises calculating an elapsed time measured from the start of the telephone call connection with the call destination as indicated by a clock of the end-user device and determining when the elapsed time reaches the maximum call duration.

33. The method as claimed in claim 31, wherein the credit data includes a value representing a number of units determined by the control center, the terminating step comprising measuring a time interval corresponding to one unit and counting said intervals from the start of the telephone call connection with the call destination and determining when the number of intervals equals the number of units.

34. The method as claimed in claim 29, wherein the input data includes a telephone number of the call destination, wherein the routing data is representative of at least part of a modified telephone number defining the preferred route, and wherein the initiating step initiates the telephone call connection using the modified telephone number.

35. The method as claimed in claim 34, wherein the routing data is representative of the entire preferred telephone number for use in the initiating step.

36. The method as claimed in claim 34, wherein the routing data is representative of a prefix code and wherein the initiating step comprises adding the prefix code to the input telephone number to obtain the preferred telephone number.

37. The method as claimed in claim 33, wherein the response message includes protocol information and wherein the initiating step is made responsive to the protocol information when initiating the telephone call connection with the call destination using the routing data.

38. The method as claimed in claim 37, wherein the protocol information defines a wait period to be inserted between outputting of an initial portion and a remaining portion of the modified telephone number.

39. The method as claimed in claim 33, wherein the input data includes a network address of the call destination.

40. The method as claimed in claim 29, further comprising:
storing identification information for identifying the end-user device to the control center and wherein the message generating step includes the identification information in the request message.

41. The method as claimed in claim 29, wherein the initiating step initiates the telephone call connection with the control center whereby the request message is output via the telecommunications system.

42. The method as claimed in claim 29, wherein the output step outputs the request message using a first communications channel which is separate and distinct from a second communications channel used in the initiating step.

43. The method as claimed in claim 42, wherein the request message is output via one of:
(a) the Internet;
(b) a public data network; and
(c) a private data network.

44. The method as claimed in claim 29, wherein the end-user device is a telecommunications terminal, and
wherein the receiving step comprises receiving the input of the input data by a user via a keyboard.

45. The method as claimed in claim 29, wherein the end-user device includes a mobile telephone for wireless communication with a mobile telephone network of the telecommunications system.

46. The method as claimed in claim 45, wherein the request message is output in a text message format corresponding to a text message protocol of the mobile telephone network.

47. The method as claimed in claim 45, wherein the response message is received in a text message format corresponding to a text message protocol of the mobile telephone network, and
wherein the mobile telephone inhibits display to the user of text corresponding to the response message.

48. The method as claimed in claim 45, further comprising:
updating at least one of a preferred network table and a barred network table using updating information contained in the response message.

49. The method as claimed in claim 45, wherein the control of duration in accordance with credit data includes operating an application processed by a SIM card of the mobile telephone.

50. The method as claimed in claim 29, wherein the end-user device is an interface apparatus providing a connection to at least one user operable terminal, wherein the receiving step comprises receiving the input data from the user operable terminal.

51. The method as claimed in claim 50, wherein the end-user device is a routing device providing a connection to a user operable terminal, and
wherein the receiving step comprises receiving the input telephone number via the connection with the user operable terminal.

52. The method as claimed in claim 29, wherein the subscription account is a prepaid subscription account, and
wherein the account data representative of remaining credit corresponds to call charges for which prepayment has been made.

53. A control center, comprising:
a receiving unit configured to receive, from an end-user device, a request message including data representative of an input telephone number defining a call destination and information defining the location of the end-user device from which a communication with the call destination via a telecommunications system is required;
a routing unit configured to determine a preferred route for the communication, originating at the end-user device and terminating at the call destination, via the telecommunications system;
a credit unit configured to determine credit data representative of remaining credit in a prepaid subscription account of an end-user of the end-user device;
a response unit configured to generate a response message including routing data representative of at least part of a preferred telephone number to be used by the end-user device and including the credit data; and
a transmitting unit configured to transmit the response message to the end-user device.

54. A method of operating a control center, comprising:
receiving, from an end-user device, a request message including data representative of an input telephone number defining a call destination and information defining the location of the end-user device from which a communication with the call destination via a telecommunications system is required;
determining a preferred route for the communication, originating at the end-user device and terminating at the call destination, via the telecommunications system;
generating a response message including routing data representative of at least part of a modified telephone number to be used by the end-user device and credit data representative of remaining credit in a prepaid subscription account of an end-user of the end-user device; and
transmitting the response message to the device.

55. A computer readable medium comprising processor implementable instructions for controlling an end-user device to carry out a method for communicating with a call destination via a telecommunications system using a credit controlled subscription account, the method comprising:
  receiving an input telephone number defining the call destination directly from an end-user;
  generating a request message including data representative of the input telephone number;
  outputting the request message to a control center;
  receiving a response message from the control center, the response message including routing data defining a preferred route for routing a call from the end-user device to the call destination via the telecommunications system and credit data representative of remaining credit within an account limit of the subscription account;
  initiating a telephone call connection, originating at the end-user device and terminating at the call destination, using the routing data; and
  controlling the duration of the call in accordance with the credit data.

* * * * *